(12) United States Patent
Fujimori et al.

(10) Patent No.: US 6,200,659 B1
(45) Date of Patent: Mar. 13, 2001

(54) POLYESTER, STRETCH BLOW MOLDED PRODUCT FORMED THEREOF AND METHOD FOR PRODUCING POLYESTER

(75) Inventors: Yoshihiro Fujimori; Toshiyuki Hamano; Hitoshi Matsumoto; Kazuyoshi Mino, all of Mie; Katsuji Tanaka, Tokyo, all of (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/203,535

(22) Filed: Dec. 1, 1998

(30) Foreign Application Priority Data

Dec. 2, 1997 (JP) .................................................. 9-331516
Aug. 27, 1998 (JP) ................................................ 10-241273

(51) Int. Cl.⁷ .............................. B29C 49/64; C08K 3/08
(52) U.S. Cl. ...................... 428/35.7; 428/35.8; 428/36.4; 528/285; 528/286; 528/274
(58) Field of Search ................................. 528/285, 286, 528/274; 428/35.7, 35.8, 36.4

(56) References Cited

U.S. PATENT DOCUMENTS

| 3,951,905 | * | 4/1976 | Sano et al. ........................ 260/40 R |
| 5,419,936 | | 5/1995 | Tindale ............................. 428/35.8 |
| 5,608,032 | * | 3/1997 | Yuo et al. ............................ 528/286 |

FOREIGN PATENT DOCUMENTS

| 0 693 356 | 1/1996 | (EP) . |
| 1058387 | 2/1967 | (GB) . |
| 74020638 | * | 5/1974 | (JP) . |
| 49-20638 | 5/1974 | (JP) . |
| WO 94/10242 | 5/1994 | (WO) . |

OTHER PUBLICATIONS

Derwent Abstracts, AN 74–46217V, JP 49 020638, May 25, 1974.

* cited by examiner

*Primary Examiner*—Rena L. Dye
*Assistant Examiner*—Sow-Fun Hon
(74) *Attorney, Agent, or Firm*—Oblon, Spivak, McClelland, Maier & Neustadt, P.C.

(57) ABSTRACT

Disclosed are a polyester mainly composed of an aromatic dicarboxylic acid as an acid component and an aliphatic diol as a diol component, wherein the content of an antimony element in the polyester is from 50 to 350 ppm, the number of metallic antimony particles having a diameter of 0.5 μm or more is 30,000 or more per 100 mg of polyester, the ratio of the number of fine particles having a diameter of 0.5 μm to less than 0.6 μm is 70% or more, and the L value in hue is 80 or more; a stretch blow molded product formed of the polyester; and a method for producing a polyester mainly composed of an aromatic dicarboxylic acid as an acid component and ethylene glycol as a diol component which comprises adding a preliminary mixed catalyst solution of an antimony compound and a trivalent phosphorus compound as a catalyst, the catalyst solution having a haze of 10% or less, at a stage showing an acid value of 1,000 eq/ton or less before initiation of melt polymerization.

10 Claims, No Drawings

POLYESTER, STRETCH BLOW MOLDED PRODUCT FORMED THEREOF AND METHOD FOR PRODUCING POLYESTER

FIELD OF THE INVENTION

The present invention relates to a polyester containing antimony metallic particles, a stretch blow molded product formed thereof, and a method for producing a polyester containing antimony metallic particles.

BACKGROUND OF THE INVENTION

Polyesters including polyethylene terephthalate are excellent in mechanical strength, chemical stability, gas barrier properties and hygienic properties, and relatively inexpensive and lightweight. They have been therefore widely used as packaging containers for various foods and drinks.

When these packaging containers are produced, methods are used in which preformed articles are first formed and then heated again to soften them, followed by reforming to desired shapes. For example, when stretch blow molded products are produced, closed-end tubular preforms are first produced by injection molding, and these preforms are usually heated again with near infrared heaters to soften them. Thereafter, the softened preforms are allowed to come into contact with metal molds having specified shapes, thereby producing the blow molded products. However, these methods have the problem that productivity is poor because it takes time to heat the preforms again.

For solving such a problem, U.S. Pat. No. 5,419,936 proposes a packaging material comprising a thermoplastic polymer composition comprising a polymer which contains metal particles intrinsically absorbing radiation in the wavelength region 500 nm to 2000 nm in such an amount that the reheat time of the polymer is less than the reheat time of the polymer in the absence of the particles. Here, the radiation in the wavelength region 500 nm to 2000 nm is a radiation generated by a general near infrared heater. The above U.S. patent further discloses in the working examples a method of adding a trivalent phosphorus compound to a polyethylene terephthalate prepolymer as a reducing agent, 10 minutes after that, adding antimony trioxide as a reducible metal compound, followed by polymerization, and reacting the metal compound with the reducing agent to generate fine metal particles. However, a result of detailed studies by the present inventors has revealed that this method shows a large variation in size of particles generated and gives a considerably large number of coarse particles. The coarse particles are smaller in surface area than fine particles having the same volume, so that the radiation absorption efficiency is insufficient. Accordingly, when this composition is formed into a packaging material, the transparency thereof is poor. Further, when this composition is formed into a packaging material, the coarse particles raise the color tone and external problems that the packaging material strongly inclines to black, and that the coarse particles are observed as black foreign matter, because the coarse particles are metal particles, which are tinged with black. Furthermore, it is necessary to add a large amount of a relatively expensive trivalent phosphorus compound, because of the insufficient radiation absorption efficiency.

On the other hand, JP-B-49-20638 (the term "JP-B" as used herein means an "examined Japanese patent publication") discloses a method for producing a polyester which comprises using a reaction solution in which metallic antimony is precipitated by allowing phosphorous acid, hypophosphorous acid, or an ester or salt thereof to act on a solution or suspension of an antimony compound as a polycondensation catalyst. However, as a result of detailed studies in this method by the present inventors, the ratio of coarse particles to precipitated particles contained in a polyester obtained by this method is high, and the radiation absorption efficiency is insufficient. Accordingly, when this polyester is formed into a packaging material, problems are encountered with regard to transparency and color tone.

SUMMARY OF THE INVENTION

An object of the present invention is to provide a polyester used as a raw material for various molded products and packaging materials, which is very high in temperature elevating speed at the time when heated, can be heated to a processing temperature for a short period of time, is excellent in transparency and color tone after processing, and is also excellent in productivity and moldability.

Another object of the present invention is to provide a stretch blow molded product excellent in transparency.

A further object of the present invention is to provide a method by which a polyester having excellent characteristics as described above can be produced efficiently at low cost.

As a result of intensive studies for achieving the above-mentioned objects, the present inventors have completed this invention.

The present invention provides:

A polyester mainly composed of an aromatic dicarboxylic acid as an acid component and an aliphatic diol as a diol component, wherein the content of an antimony element in said polyester is from 50 to 350 ppm, the number of metallic antimony particles having a diameter of 0.5 $\mu$m or more is 30,000 or more per 100 mg of polyester, the ratio of the number of fine particles having a diameter of 0.5 $\mu$m to less than 0.6 $\mu$m is 70% or more, and the L value based on Hunter Color Space (hereinafter "Hunter L value") is 80 or more;

A stretch blow molded product formed of said polyester; and

A method for producing a polyester mainly composed of an aromatic dicarboxylic acid as an acid component and ethylene glycol as a diol component which comprises adding a preliminary mixed catalyst solution of an antimony compound and a trivalent phosphorus compound as a catalyst, said catalyst solution having a haze of 10% or less, at a stage showing an acid value of 1,000 eq/ton or less before initiation of melt polymerization.

DETAILED DESCRIPTION OF THE INVENTION

The present invention will be described below in detail.

The polyester of the present invention is a polyester mainly composed of an aromatic dicarboxylic acid as an acid component and an aliphatic diol as a diol component. As the aromatic dicarboxylic acid, terephthalic acid or 2,6-naphthalenedicarboxylic acid is preferably used. The amount thereof is preferably 90 mol % or more, more preferably 95 mol % or more, and most preferably 97 mol % or more, based on the total acid component. As the aliphatic diol, ethylene glycol is preferably used. The amount thereof is preferably 90 mol % or more, and more preferably 95 mol % or more, based on the total diol component. Examples of the other dicarboxylic acid components include aromatic dicarboxylic acids such as isophthalic acid, orthophthalic acid, cyclohexanedicarboxylic acid, dibromoisophthalic acid, sodium sulfoisophthalate, biphenyldicarboxylic acid, biphenyletherdicarboxylic acid, biphenylsulfondicarboxylic acid, biphenylketonedicarboxylic acid, biphenoxyethanedicarboxylic acid and phenylenedioxydicarboxylic acid; and aliphatic dicarboxylic acids such as adipic acid, sebacic acid, succinic acid, glutaric acid, pimelic acid, suberic acid, azelaic acid, undecanedicarboxylic acid and dodecanedicarboxylic acid. In particular, isophthalic acid is preferred as a copolymerization component with terephthalic acid, and the amount of isophthalic acid is more preferably 3 mol % or less based on the total acid component.

The other diol components include, for example, aliphatic glycols such as trimethylene glycol, tetramethylene glycol, pentamethylene glycol, hexamethylene glycol, octamethylene glycol, decamethylene glycol, propylene glycol, diethylene glycol, polyethylene glycol and polyoxytetramethylene glycol; alicyclic glycols such as 1,4-cyclohexanedimethanol and 1,4-cyclohexanediol; branched aliphatic glycols such as neopentyl glycol and 2-butyl-2-ethyl-1,3-propanediol; aromatic glycols such as xylylene glycol; and ethylene oxide addition products and propylene oxide addition products of 2,2-bis(4-hydroxyphenyl) propane. Of these, diethylene glycol may be added as a raw material from the beginning, but it is generally produced as a by-product component when polyethylene terephthalate is produced.

In addition to these aromatic dicarboxylic acids and aliphatic diols, other monomers can be added as long as they do not decrease the effect of the present invention. The other monomers include monofunctional components such as stearic acid and benzoic acid; and multifunctional components, at least trifunctional components, such as trimellitic acid, trimesic acid, pyromellitic acid, tricarballylic acid, gallic acid, trimethylolpropane, triethylolethane, pentaerythritol, glycerol and tetrakis[methylene-3-(3',5'-di-t-butyl-4'-hydroxyphenyl)propionate]methane.

It is necessary that the polyester of the present invention contains an antimony element in an amount of 50 to 350 ppm. The content of the antimony element is preferably from 100 to 300 ppm, and more preferably from 150 to 250 ppm. In this case, ICP emission spectrochemical analysis is used for the determination of the antimony element. If the content of the antimony element is less than 50 ppm, the number of antimony element-containing particles becomes insufficient, so that it unfavorably takes long time to heat a preformed article again to a required temperature. On the other hand, exceeding 350 ppm results in a reduction in the ratio of fine particles, which unfavorably causes deterioration of transparency and color tone when the polyester is formed into a molded product or packaging material.

The antimony element in the polyester is contained as metallic antimony or an antimony compound, and is, for example, an antimony element derived from an antimony compound added as a catalyst in producing the polyester. The antimony compounds used as catalysts in this case include oxides, aliphatic or aromatic carboxylates, halides, oxyhalides and alcoholates of antimony. Of these, glycol-soluble antimony compounds such as antimony trioxide, antimony acetate and antimony trisethylene glycoxide are preferred with respect to the haze of catalyst solutions and the effect of the present invention.

It is further necessary that the polyester of the present invention contains 30,000 or more of metallic antimony particles having a diameter of 0.5 $\mu$m or more, per 100 mg of polyester. The number of the metallic antimony particles is preferably 100,000 to 1,000,000. If the number of the metallic antimony particles is less than 30,000, it unfavorably takes long time to heat a preformed article again to a required temperature. If the number of the metallic antimony particles exceeds 1,000,000, transparency and color tone tend to deteriorate when the polyester is formed into a molded product or packaging material.

Further, in the polyester of the present invention, the ratio of the number of fine particles having a diameter of 0.5 $\mu$m to less than 0.6 $\mu$m to the number of the 30,000 or more metallic antimony particles having a diameter of 0.5 $\mu$m or more contained in 100 mg of the polyester is required to be 70% or more. If the ratio of the number of fine particles is less than 70%, it unfavorably takes long time to heat a preformed article again, and transparency and color tone unfavorably deteriorate when the polyester is formed into a molded product or packaging material. The ratio of the number of fine particles is preferably 90% or more, and more preferably 98% or more.

Furthermore, in the present invention, the ratio of the number of coarse particles having a diameter of 1.5 $\mu$m or more to the number of metallic antimony particles having a diameter of 0.5 $\mu$m or more contained in 100 mg of the polyester is preferably 1% or less. It is more preferred that the ratio of the number of coarse particles having a diameter of 1 $\mu$m or more is 1% or less, and it is particularly preferred that the ratio of the number of coarse particles having a diameter of 0.7 $\mu$m or more is 1% or less.

Here, the number of particles having a diameter of 0.5 $\mu$m or more is measured in the following manner. That is to say, 100 mg of a freeze-pulverized polyester is precisely weighed, and dissolved in 10 ml of o-chlorophenol at 100° C. for 2 hours. The number and diameter of particles in this solution are measured by a HIAC PC-320 type particle size analyzer manufactured by Pacific Scientific Co., thereby obtaining the number of particles having a particle size of 0.5 $\mu$m or more and the particle distribution thereof. The resulting number of particles is divided by the weight of the polyester used for measurement to determine the number of particles per 100 mg of polyester.

It can be conformed in the following manner that the measured particles are metallic antimony particles. That is to say, 30 g of the polyester is dissolved in 379 g of o-chlorophenol with stirring at 100° C. for 2 hours, and then, particles which remain undissolved are sedimented at 12,000 revolutions per minutes for 60 minutes by a high-speed centrifugal separator. Sediment thus obtained by centrifugation is washed and dried under vacuum, and thereafter, it is confirmed by the X-ray diffraction method whether the sediment are metallic antimony or not.

Further, the polyester of the present invention is required to have an Hunter L value of 80 or more. Less than 80 unfavorably results in remarkable blackish colors when the polyester is formed into a molded product. In this case, the L value is a value measured by the reflection method using a 300A type calorimetric color-difference meter manufactured by Nippon Denshoku Kogyo Co., Ltd.

The color-difference meter is previously allowed to stand for 4 hours or more after putting of a power supply for sufficient stabilization, and subsequently, a measuring cell having an inside diameter of 36 mm and a depth of 15 mm (a light-receiving part thereof is made of quartz glass) is filled with just a cellful of pellets. The direction of the measuring cell is changed to four directions for each 90 degrees, and the L value is measured four times in total. The mean value thereof is taken as the L value of the present invention.

It is preferred that the polyester of the present invention contains a phosphorus element, for increasing the ratio of the number of fine particles having a diameter of 0.5 µm to less than 0.6 µm to 70% or more. The content of the phosphorus element is preferably 2 to 100 ppm, and more preferably 5 to 50 ppm. The phosphorus element can be added as a phosphorus compound during polymerization of the polyester.

As the phosphorus compounds, trivalent phosphorus compounds are preferably used, and pentavalent phosphorus compounds can also be used as needed. The trivalent phosphorus compounds include phosphorous acid, hypophosphorous acid, esters thereof (for example, diethyl phosphite, triphenyl phosphite, trisdodecyl phosphite and trisnonyldecyl phosphite) and metal salts thereof such as lithium, sodium and potassium salts. Of these, phosphorous acid and diethyl phosphite are preferred. Further, the pentavalent phosphorus compounds include phosphates such as trimethyl phosphate, triethyl phosphate, tri-n-butyl phosphate, trioctyl phosphate, triphenyl phosphate and tricresyl phosphate, acidic phosphates such as methyl acid phosphate, ethyl acid phosphate, isopropyl acid phosphate, butyl acid phosphate, dibutyl acid phosphate, monobutyl phosphate and dioctyl phosphate, and phosphorus compounds such as phosphoric acid and polyphosphoric acid.

Of these, phosphorous acid is preferably used for increasing the ratio of the number of fine particles having a diameter of 0.5 µm to less than 0.6 µm.

The intrinsic viscosity of the polyester of the present invention is from 0.50 to 1.50 dl/g, preferably from 0.55 to 1.0 dl/g, more preferably from 0.60 to 0.90 dl/g and particularly preferably from 0.65 to 0.85 dl/g, for a polyester composed of terephthalic acid and ethylene glycol as main components. The value of the intrinsic viscosity can be adjusted by the time and temperature of melt polymerization and the time and temperature of solid phase polymerization. When the intrinsic viscosity is less than 0.50 dl/g, the strength of a resulting molded product tends to become insufficient. On the other hand, when the intrinsic viscosity exceeds 1.50 dl/g, the moldability tends to deteriorate.

The polyester of the present invention is high in the ratio of the number of fine particles, so that it is excellent in transparency. The polyester of the present invention can therefore show excellent transparency within the intrinsic viscosity range of 0.65 to 0.85 dl/g, which gives the best balance between the strength of the molded product and the moldability. Accordingly, this range is particularly preferred.

The intrinsic viscosity is normally determined by freeze-pulverizing a polyester, dissolving the pulverized polyester in a mixed solvent of phenol/tetrachloroethane (weight ratio: 1/1) to prepare four kinds of solutions having concentrations of 0.1, 0.2, 0.5 and 1 g/dl, and measuring the viscosity of each solution at a temperature of 30° C. by an Ubbelohde capillary viscometer.

The polyester of the present invention can be obtained by controlling a method for adding metallic antimony or an antimony compound or polymerization conditions during the production of the polyester so that the number of metallic antimony particles having a diameter of 0.5 µm or more is 30,000 or more, and the ratio of the number of fine particles having a diameter of 0.5 µm to less than 0.6 µm is 70% or more.

Usually, an antimony compound is used as a polycondensation catalyst for a polyester, so that the antimony compound is preferably used as the polycondensation catalyst also in the production of the polyester of the invention.

Methods for producing the polyesters of the present invention are described below in detail, but are not limited thereto.

It is preferred that a preliminary mixed catalyst solution of an antimony compound and a trivalent phosphorus compound is used as a polycondensation catalyst. The haze of this preliminary mixed catalyst solution is 10% or less, preferably 5% oar less, and more preferably 3% oar less. When haze of the preliminary mixed catalyst solution exceeds 10%, it is difficult to obtain the polyester excellent in transparency and color tone.

This preliminary mixed catalyst solution is obtained by mixing the antimony compound, the trivalent phosphorus compound and a solvent with stirring in specified order of addition and under specified conditions. The solvents which can be used herein include alcohols such as ethylene glycol, methanol, ethanol and propanol, water and other organic or inorganic solvents. Of these, ethylene glycol and water are preferred. Specifically, for example, the antimony compound is preliminarily mixed with ethylene glycol to prepare an antimony solution having a haze of 10% or less, and the trivalent phosphorus compound is added thereto and dissolved therein at a temperature ranging from 60° C. to 140° C., thereby preparing the catalyst solution.

It is presumed that the antimony compound added as the catalyst is modified in some sense during polymerization by the trivalent phosphorus compound preliminarily mixed, which causes precipitation of antimony as particles having a specified number and particle size ratio.

Further, in the present invention, the preliminarily mixed catalyst solution is preferably used in which the weight ratio of the antimony element contained in the antimony compound to the trivalent phosphorus element contained in the trivalent phosphorus compound is from 1 to 200, and in which the weight ratio of the antimony element to the solvent is from 0.001 to 0.05. The former ratio is more preferably from 2 to 50, and the latter ratio is more preferably from 0.1 to 0.6 and most preferably from 0.15 to 0.4. The above-mentioned preliminarily mixed catalyst solution can contain a catalyst, an auxiliary, a stabilizer and the like, in addition to the antimony compound and the trivalent phosphorus compound, as long as the effect of the present invention is not impaired.

The polyesters are produced by polymerization using these catalyst solutions. As manufacturing processes of the polyesters, known methods can be employed. For example, the polyester can be produced by esterification of an aromatic dicarboxylic acid and/or an ester thereof as an acid component and an aliphatic diol as a diol component and melt polymerization, followed by solid phase polymerization if necessary. First, for the esterification, a direct esterification reaction is conducted at atmospheric pressure or under pressure using, for example, terephthalic acid, ethylene glycol and another comonomer to obtain an oligomer. In this case, the temperature of the esterification reaction is usually from 240° C. to 280° C., and preferably from 250° C. to 270° C., and the pressure thereof is from 0 to 3 kg/cm G, and preferably from 0 to 2 kg/cm G. The oligomer can be obtained by stirring for 1 to 10 hours. The polyester oligomer obtained herein is usually an oligomer having an acid value of 300 to 1200 eq/ton.

Then, for the melt polymerization, a polycondensation reaction is conducted by further elevating the temperature of the polyester oligomer obtained by esterification, in the presence of the catalyst solution prepared above, and gradually reducing pressure at the same time.

The temperature of the melt polymerization is usually 260° C. to 290° C., and preferably 265° C. to 285° C., and the pressure thereof is gradually reduced from atmospheric pressure to usually 0.1 to 10 Torr, preferably 0.5 to 5 Torr. The intrinsic viscosity of the polyester thus obtained by the melt polymerization is preferably from 0.50 to 0.70 dl/g, more preferably from 0.55 to 0.65 dl/g, and further preferably from 0.57 to 0.63 dl/g, for example, when the polyester is produced using terephthalic acid and ethylene glycol as main components. When the intrinsic viscosity is without the range of 0.50 to 0.70 dl/g, the reaction of the antimony compound with the trivalent phosphorus contained in the catalyst solution prepared above probably does not optimally proceed. Accordingly, the size of the particles precipitated in the melt polymerization stage tends to vary, or coarse particles tend to increase in number.

Further, the catalyst solution prepared is preferably added at a stage showing an acid value of 1,000 eq/ton or less before initiation of the melt polymerization. In this case, the acid value is determined by dissolving 0.1 g of the polyester before initiation of the melt polymerization in 3 ml of benzyl alcohol, adding 5 ml of chloroform thereto, and titrating the resulting solution with a 0.1 N solution of NaOH in benzyl alcohol using Phenol Red as an indicator.

Furthermore, this preliminarily mixed catalyst solution is preferably added so that the concentrations of the antimony element and trivalent phosphorus element contained in the polymer obtained after the melt polymerization are within the ranges of 50 to 350 ppm and 2 to 100 ppm, respectively. The range of the former is more preferably from 100 to 300 ppm, and most preferably from 150 to 250 ppm, and the range of the latter is more preferably from 5 to 50 ppm, and most preferably from 10 to 25 ppm. If the preliminarily mixed catalyst solution is added at a stage other than the stage showing an acid value of 1,000 eq/ton or less before initiation of the melt polymerization, or the amounts of the antimony element and trivalent phosphorus element contained in the above-mentioned polymer are without the above-mentioned ranges, the near infrared absorption efficiency at the time when the preformed article is heated again, the transparency and the color tone tend to deteriorate.

The polyester obtained by the melt polymerization is usually melt extruded into a strand form, followed by cutting with a cutter into pellets (chips). It is preferred that the polyester pellets are further heat treated to perform crystallization and high polymerization by solid phase polymerization.

In that case, the crystallization and the solid phase polymerization are conducted by crystallizing surfaces of the polyester pellets usually in the presence of an inert gas such as dried nitrogen, argon or carbon dioxide, water vapor or a water vapor-containing inert gas, usually at a temperature of 60° C. to 180° C., preferably 150° C. to 170° C., and then, fluidizing the polyester pellets so as to prevent the pellets from sticking to one another by a process such as a rolling process or a fluidized bed process under reduced pressure or in the presence of an inert gas at a temperature ranging from a sticking temperature of the polyester to a temperature 80° C. lower than the sticking temperature, preferably at a temperature 10° C. to 60° C. lower than the sticking temperature for tens of hours or less. The solid phase polymerization is low in the polymerization temperature, compared to the melt polymerization. Accordingly, the reaction of the antimony compound with the trivalent phosphorus compound contained in the catalyst solution prepared above probably proceeds relatively mildly to allow the polymerization degree to increase. Hence, the polyester satisfying the number of metallic antimony particles and the ratio of the number of fine particles, which are the requirements of the present invention, can be easily obtained. In addition, there is the advantage that the amounts of acetaldehyde and polyester oligomers are also reduced.

In producing the polyester, an esterification catalyst and another polycondensation catalyst can be used, in addition to the catalyst solution prepared above, and an auxiliary for preventing deterioration of the polyester and a stabilizer can further be used. The esterification catalyst may not be added because terephthalic acid acts as an autocatalyst. However, a small amount of an inorganic acid may be used. Further, another polycondensation catalyst, a salt of an alkali metal such as sodium or lithium, a salt of an alkaline earth metal such as magnesium or calcium, or a compound of a metal such as zinc or manganese may also be used.

The other polycondensation catalysts include germanium compounds such as germanium dioxide, titanium compounds such as tetra-n-butoxytitanium, cobalt compounds and tin compounds.

The catalyst, the auxiliary and the stabilizer can be supplied in preparing a raw material slurry, at any stage of the esterification process and at an early stage of the melt polymerization process. They can also be added to the catalyst solution prepared above. The polyester may be produced either by a batch process or by a continuous process. However, the continuous process is preferred in respect to satisfaction of the number of particles and the ratio of the number of fine particles fulfilling the requirements of the present invention, and overall characteristic such as transparency and color tone.

The polyester of the present invention can be formed into various extrusion molded products, injection molded products, blow molded containers and drawn containers by methods similar to those of conventional polyethylene terephthalate. Further, the polyester of the present invention has the advantage that the ratio of the number of fine particles to the number of metallic antimony particles is high. Making use of this advantage, the polyester is preferably used for hollow containers obtained by heating again preforms once injection molded and blow molding them, and drawn containers obtained by heating again sheets once extrusion molded, and drawing them.

For example, when a stretch blow molded hollow container is produced, a closed-end tubular preform is first produced by injection molding at a resin temperature of 200° C. to 350° C. and at a metal mold temperature of 0C to 30° C., and the preform is heated again at a temperature of 70° C. to 130° C. to soften it. Thereafter, the softened preform is blown to allow it to come into close contact with a metal mold having a specified shape at a blow metal mold temperature of ordinary temperature to 200° C., thereby producing the blow molded product. In this case, the resulting hollow container may be heat set at a temperature ranging from 70° C. to 200° C. by known methods, for improving the heat resistance.

Further, for example, a drawn container is produced, a raw material polyester is supplied from a hopper into a cylinder of a single- or double-screw extruder by a screw or screws, and plasticized by melting. Then, the polyester is transferred under shear of the screw or screws through the cylinder, and after an elapse of a definite residence time, it is extruded through a die. The extruded polyester is cooled with a casting roll set to a temperature of 0° C. to 30° C. by circulating a coolant in the inside thereof, thereby obtaining a sheet having a thickness of 100 to 800 μm. This sheet is heated again to a glass transition temperature of the extruded sheet or higher, usually a temperature of 70° C. to 150° C., and then, allowed to come into contact with a metal mold having a specified shape and a mold temperature of 0C to 30° C., thereby producing the molded product.

Further, when these molded products and containers are produced, various additives such as known nucleating agents, inorganic fillers, lubricants, slipping agents, anti-blocking agents, stabilizers, antistatic agents, anti-fogging agents and pigments may be added to the raw material polyesters, as long as the effect of the present invention is not impaired.

EXAMPLES

The present invention will be further illustrated in greater detail with reference to the following examples and comparative examples, which are, however, not to be construed as limiting the invention. Various measuring methods and evaluating methods in the examples are as follows:

<Measurement of the Haze of Catalyst Solution>

A preliminarily mixed catalyst solution or a catalyst solution stored at a temperature of 60° C. was sampled, and allowed to stand in a chamber maintained at 23° C. and 50% RH for 3 hours. When sedimentation was observed, the catalyst solution was sufficiently stirred. Thereafter, the haze was measured with an NDH-300A type haze meter manufactured by Nippon Denshoku Kogyo Co. under the conditions of 230C and 50% RH. A control cell was filled with ethylene glycol.

<Determination of Antimony Element and Phosphorus Element>

A polyester (2.0 g) obtained in each of the examples and comparative examples was ashed in the presence of sulfuric acid. After complete decomposition, distilled water was added to bring the volume to 100 ml, and measurement was made for the resulting solution by ICP emission spectrochemical analysis.

<Composition Analysis of Polyester>

A polyester obtained in each of the examples and comparative examples was dissolved in deuterated trifluoroacetic acid at the normal room temperature to prepare a 3 wt % solution. For this solution, $^1$H-NMR was measured with a JNM-EX 270 type nuclear magnetic resonance analyzer manufactured by JEOL Ltd., and each peak was assigned. From the integral ratio thereof, dicarboxylic acid components other than terephthalic acid and diol components other than ethylene glycol were calculated.

<Acid Value>

A polyester was pulverized, and thereafter, dried with a hot air dryer at 140° C. for 15 minutes, followed by cooling to room temperature in a desiccator. Then, 0.1 g of the pulverized sample was precisely weighed, and placed in a test tube. Benzyl alcohol (3 ml) was added thereto, and the sample was dissolved with blowing dried nitrogen gas therein at 195° C. for 3 minutes. Thereafter, 5 ml of chloroform was gradually added, and the solution was cooled to room temperature. To this solution, 1 to 2 drops of a Phenol Red indicator were added, and titration was conducted with a 0.1 N solution of NaOH in benzyl alcohol, in which the titer was known, with blowing dried nitrogen gas therein and stirring. A point at which the color was turned from yellow into red was taken as the end point. As a blank, the above-mentioned procedure was carried out without using the polyester, and the acid value was calculated according to the following equation:

$$\text{Acid value (eq/ton)} = (A-B) \times 0.1 \times f / W$$

wherein the abbreviations are as follows:

A: Amount of 0.1 N NaOH required for titration ($\mu$l)
B: Titration amount of a blank ($\mu$l)
W: Amount of a polyester sample (g)
f: Titer of 0.1 N NaOH benzyl alcohol <Intrinsic Viscosity>

A polyester obtained in each of the examples and comparative examples was freeze-pulverized, and then, the pulverized polyester was dissolved in a mixed solvent of phenol/tetrachloroethane (weight ratio: 1/1) at a temperature of 100° C. to 110° C. for 20 minutes to prepare four kinds of solutions having concentrations of 0.1, 0.2, 0.5 and 1 g/dl. The viscosity of each solution was measured at a temperature of 30° C. by an Ubbelohde capillary viscometer, thereby normally determining the intrinsic viscosity.

<Measurement of Acetaldehyde Amount)

A freeze-pulverized polyester (5.0 g) was precisely weighed, sealed together with 10.0 ml of pure water in a microbomb, and heated at 160° C. for 2 hours to extract acetaldehyde into water. The amount of acetaldehyde contained in the extract was determined with a GC-14A gas chromatography manufactured by Shimadzu Corp. using isobutyl alcohol as an internal standard.

<Measurement of the Number of Particles and the Number of Fine Particles>

A freeze-pulverized polyester (100 mg) obtained in each of the examples and comparative examples was precisely weighed, and dissolved in 10 ml of o-chlorophenol at 100° C. for 2 hours. The number of particles having a size of 0.5 $\mu$m or more and the particle size thereof were measured by a HIAC PC-320 type particle size analyzer manufactured by Pacific Scientific Co. The ratio of the number of fine particles having a size of 0.5 $\mu$m to less than 0.6 $\mu$m to the number of particles measured was determined as the ratio of the number of fine particles (%). Further, the critical particle size R ($\mu$m) was determined at which the ratio of the number of coarse particles having a size of R ($\mu$m) or more to the total number of particles having a size of 0.5 $\mu$m or more was 1% or less.

<Rate of Solid Phase Polymerization>

The difference between the intrinsic viscosity of a polyester obtained by solid phase polymerization and that of a polyester obtained by melt polymerization was determined, and this difference was divided by the polymerization time of solid phase polymerization to give the rate of solid phase polymerization.

<Measurement of Hunter L and b Values>

The L value (blackness) and b value (yellowness) of polyester pellets obtained in each of the examples and comparative examples was measured by the reflection method using a 300A type colorimetric color-difference meter manufactured by Nippon Denshoku Kogyo Co., Ltd. In measuring, the color-difference meter was previously allowed to stand for 4 hours or more after putting of a power supply for sufficient stabilization, and subsequently, a measuring cell having an inside diameter of 36 mm and a depth of 15 mm (a light-receiving part thereof is made of quartz glass) was filled with just a cellful of pellets. The direction of the measuring cell was changed to four directions for each 90 degrees, and the L value and b value are measured four times in total. The mean value thereof is taken as the L value and b value of the present invention.

<Evaluation of Bottle Molding>

(1) Evaluation of Reheating Efficiency and Transparency

A polyester obtained in each of the examples and comparative examples was sufficiently dried, and injection molded into a test tube-like preform having a height of 165 mm, an outer tube diameter of 29.0 mm, an average thickness of 3.7 mm and a weight of 60 g/m², by use of an injection molding machine "IS-60B", manufactured by Toshiba Machine Co., Ltd. at a resin temperature of 280° C., a back pressure of about 5 kg/cm², an injection pressure of about 100 kg/cm², a holding pressure of about 50 kg/cm², a metal mold temperature of 20° C. and a molding cycle of about 40 seconds.

This preform was heated in a near infrared irradiation furnace comprising a quartz heater at a given output for 55 seconds, and then, allowed to stand at room temperature for 25 seconds to alleviate a temperature distribution in the inside of the preformed article. Immediately after that, the preform was put in a metal mold having a specified shape which is adjusted to 20° C., and blown at a blow pressure of about 20 kg/cm² to produce a bottle having an average barrel thickness of 350 μm and a volume of 1.5 liters. Like this, 20 bottles were produced.

For the same barrel portions of the 20 bottles, the haze was measured with an NDH-300A type haze meter manufactured by Nippon Denshoku Kogyo Co., and the mean value thereof is taken as the haze (%). The high haze means that only a cloudy bottle is obtained. Conversely, the low haze means that a bottle having good transparency is obtained.

Further, the transparency of the bottles obtained was visually evaluated. Good transparency was indicated by "○", particularly good transparency by "⊙", a somewhat cloudy appearance by "Δ", and an appearance clouded like a pearl by "×".

(2) Evaluation of Black Foreign Matter

Black foreign matter existing in 20 bottles obtained in (1) was evaluated by visual observation. No existence of black foreign matter in all bottles and a good appearance was indicated by "○", existence of black foreign matter in 1 to 10 bottles by "Δ", and existence of black foreign matter in 11 or more bottles by "×".

Example 1

Antimony trioxide and ethylene glycol were placed in a catalyst preparing tank at ordinary temperature so that the concentration of antimony trioxide in ethylene glycol became 1.34% by weight, and stirred for 1 hour. Then, the temperature of the resulting solution was elevated to 165° C. for 5 hours, and the solution was further stirred for dissolution for 1 hour. Subsequently, the temperature thereof was lowered to 100° C. for 3 hours. On the other hand, a 1 wt % solution of phosphorous acid in ethylene glycol was prepared, and this solution was gradually added dropwise to the ethylene glycol solution of antimony trioxide previously prepared, at 100° C. with stirring so as to give an antimony element amount/phosphorus element amount ratio of 210/10 by weight. After further stirred for 3 hours, this solution was transferred to a reservoir maintained at 60° C., and stored therein. This solution was referred to as "catalyst solution A".

Using this catalyst solution A and a batch type polymerization apparatus comprising a one-stage slurry tank, a one-stage esterification tank and a one-stage melt polymerization tank, a polyester was produced by the following procedure.

In the slurry tank, a raw material slurry of 279 kg (1,686 mol) of terephthalic acid, 5.2 kg (31 mol) of isophthalic acid and 125 kg (2,020 mol) of ethylene glycol was prepared beforehand.

This raw material slurry was successively supplied for 4 hours to the esterification tank maintained at 260° C. After the termination of the supply, the esterification reaction was further allowed to proceed for 1 hour, and the resulting esterification product was transferred to the melt polymerization tank. The acid value of this esterification product was 450 eq/ton. Subsequently, a 1 wt % solution of orthophosphoric acid in ethylene glycol was first added through a pipe connected to the melt polymerization tank so as to give a phosphorus element amount of 23 ppm based on a polymer after polymerization, and 10 minutes after that, a 1 wt % solution of cobalt acetate in ethylene glycol was added as an auxiliary so as to give a cobalt element amount of 10 ppm based on the polymer after polymerization. Immediately after that, the catalyst solution A was added so as to give Sb element/phosphorus element amounts of 210 ppm/10 ppm based on the polymer after polymerization. The total amount of the phosphorus element contained in the polymer was 33.0 ppm.

Subsequently, the temperature in the system was elevated from 260° C. to 280° C. for 1 hour and 20 minutes, and the pressure was reduced from ordinary pressure to 1 mm Hg for 60 minutes. Keeping the pressure at 1 mm Hg, the reaction was conducted for a specified period of time. Thereafter, the produced polymer was taken out in a strand form through a takeoff attached to a bottom of the polycondensation tank. After cooling with water, the strand-like polymer was cut into a chip form to obtain about 300 kg of melt-polymerized polymer chips having an intrinsic viscosity of 0.63 dl/g.

Subsequently, surfaces of the melt-polymerized polymer chips were crystallized at 160° C. with a stirring crystallizer (Bepex type), followed by transfer to a stationary solid phase polymerization column. After drying in a stream of 20 liter/kg·hour of nitrogen at about 160° C. for 3 hours, solid phase polymerization was conducted at 205° C. for a specified period of time to obtain a polyester having an intrinsic viscosity of 0.79 dl/g.

Results of analysis and evaluation of the resulting polyester and results of evaluation of bottle molding are shown in Table 1.

The resulting polyester was high in the ratio of the number of fine particles, was not deteriorated in transparency, and externally showed no black foreign matter when molded into bottles.

Comparative Example 1

Antimony trioxide and ethylene glycol were placed in a catalyst preparing tank at the normal room temperature so that the concentration of antimony trioxide in ethylene glycol became 1.80% by weight, and stirred for 1 hour. Then, the temperature of the resulting solution was elevated to 165° C. for 5 hours, and the solution was further stirred for dissolution for 1 hour. Subsequently, the temperature thereof was lowered to 100° C. for 3 hours. The solution was stored with stirring at that temperature for 3 hours, and thereafter transferred to a reservoir maintained at 60° C., and stored therein. This solution was referred to as "catalyst solution B".

The procedure was conducted in the same manner as with Example 1 until the esterification reaction. The resulting esterification product was transferred to the melt polymerization tank. Subsequently, a 1 wt % solution of orthophosphoric acid in ethylene glycol was first added through a pipe connected to the melt polymerization tank so as to give a phosphorus element amount of 23 ppm based on a polymer after polymerization, and successively, a 1.0 wt % solution of phosphorous acid in ethylene glycol was added so as to give a phosphorus element amount of 10 ppm based on the polymer after polymerization (the total amount of the phosphorus element contained in the polymer was 33.0 ppm). Further, 10 minutes after that, a 1 wt % solution of cobalt acetate in ethylene glycol was added so as to give a cobalt element amount of 10 ppm based on the polymer after polymerization. Immediately after that, the catalyst solution B was added so as to give an antimony element amount of 210 ppm based on the polymer after polymerization. The subsequent procedure was conducted in the same manner as with Example 1, and melt-polymerized polymer chips having an intrinsic viscosity of 0.61 dl/g were subjected to solid phase polymerization to obtain a polyester having an intrinsic viscosity of 0.80 dl/g.

Results of analysis and evaluation of the resulting polyester and results of evaluation of bottle molding are shown in Table 1.

The resulting polyester was low in the ratio of the number of fine particles, and externally showed much black foreign matter when molded into bottles.

Comparative Example 2

A polyester was obtained in the same manner as with Comparative Example 1 with the exception that the intrinsic viscosity of the polyester after solid phase polymerization was 0.90 dl/g.

Results of analysis and evaluation of the resulting polyester and results of evaluation of bottle molding are shown in Table 1. The resulting polyester was somewhat better in transparency than the polyester obtained in Comparative Example 1, due to high intrinsic viscosity, but low in the ratio of the number of fine particles, and externally showed much black foreign matter when molded into bottles.

Comparative Example 2'

The preparation of a raw material slurry was performed in the same manner as with Example 1. A 1 wt % solution of orthophosphoric acid in ethylene glycol was added to the raw material slurry so that the amount of the phosphorus element derived from orthophosphoric acid became 23 ppm, and the preliminarily mixed catalyst solution A was further added so as to give an antimony element amount of 210 ppm. At this time, the acid value of the raw material slurry was 8,300 eq/ton. This raw material slurry was supplied for 4 hours to the esterification tank maintained at 260° C. After the termination of the supply, the esterification reaction was further allowed to proceed for 1 hour, and the resulting esterification product was transferred to the melt polymerization tank. Subsequently, a 1 wt % solution of cobalt acetate in ethylene glycol was added as an auxiliary through a pipe connected to the melt polymerization tank so as to give a cobalt element amount of 10 ppm. The subsequent procedure was conducted in the same manner as with Example 1, and melt-polymerized polymer chips having an intrinsic viscosity of 0.62 dl/g were subjected to solid phase polymerization to obtain a polyester having an intrinsic viscosity of 0.80 dl/g.

Results of analysis and evaluation of the resulting polyester and results of evaluation of bottle molding are shown in Table 1. The resulting polyester was low in the ratio of the number of fine particles, and externally showed much black foreign matter when molded into bottles.

Comparative Example 3

The procedure was conducted in the same manner as with Example 1 until the esterification reaction. The resulting esterification product was transferred to the melt polymerization tank. Subsequently, a 1 wt % solution of orthophosphoric acid in ethylene glycol was first added through a pipe connected to the melt polymerization tank so as to give a phosphorus element amount of 33.0 ppm based on a polymer after polymerization, and 10 minutes after that, a 1 wt % solution of cobalt acetate in ethylene glycol was added so as to give a cobalt element amount of 10 ppm based on the polymer after polymerization. Immediately after that, the catalyst solution B used in Comparative Example 1 was added so as to give an Sb element amount of 210 ppm based on the polymer after polymerization. The subsequent procedure was conducted in the same manner as with Example 1, and melt-polymerized polymer chips having an intrinsic viscosity of 0.62 dl/g were subjected to solid phase polymerization to obtain a polyester having an intrinsic viscosity of 0.79 dl/g.

Results of analysis and evaluation of the resulting polyester and results of evaluation of bottle molding are shown in Table 1.

The resulting polyester was few in the number of particles, and low in the ratio of the number of fine particles.

Comparative Example 4

Antimony trioxide (0.05 part by weight) was mixed with 1 part by weight of water and 0.01 part by weight of phosphorous acid, and the resulting mixture was heated at 100° C. for 20 hours. A solution in which black particles were precipitated was dispersed in a ball mill to suspend the particles. This was referred to as "catalyst solution C".

Melt-polymerized polymer chips having an intrinsic viscosity of 0.78 dl/g were obtained in the same manner as with Example 1 with the exception that the catalyst solution C was used and the chips were not subjected to solid phase polymerization.

Results of analysis and evaluation of the resulting polyester and results of evaluation of bottle molding are shown in Table 1.

The resulting polyester was very low in the ratio of the number of fine particles, and externally showed much black foreign matter when molded into bottles.

Example 2

Using a multistage continuous polymerization apparatus comprising a one-stage slurry tank, two-stage esterification tanks and three-stage melt polymerization tanks, a polyester was produced by the following procedure.

A slurry prepared by mixing 1,941 parts by weight per hour of high purity terephthalic acid with 676 parts by weight per hour of ethylene glycol, and an ethylene glycol solution of orthophosphoric acid (concentration: 1.0% by weight) separately prepared were continuously supplied to the first esterification tank in which 3,627 parts by weight of a reaction solution was stored beforehand, so as to give a phosphorus element amount of 23 ppm based on a polymer after polymerization, and the first-stage esterification reaction was conducted in an atmosphere of nitrogen with stirring under the conditions of 260° C. and 0.5 kg/cm$^2$·G. The average residence time was adjusted to 4 hours, and the reaction product was continuously sent to the second esterification tank.

In the second esterification tank, the second-stage esterification reaction was conducted with stirring under the conditions of 260° C. and 0.05 kg/cm$^2$·G, adjusting the average residence time to 1.5 hours. At this time, a solution of cobalt acetate in ethylene glycol (concentration: 1% by weight) and the catalyst solution A were continuously supplied to the second esterification tank through a pipe connected to a bottom thereof, so as to give a cobalt element amount of 10 ppm based on the polymer after polymerization and antimony element/phosphorus element amounts of 210 ppm/10 ppm based on the polymer after polymerization (the total amount of the phosphorus element contained in the polymer was 33.0 ppm), respectively. The average acid value in the second esterification tank was 450 eq/ton. This esterification product was continuously transferred to the first melt polymerization tank through a pipe.

The first melt polymerization tank was maintained under the conditions of 272° C. and 25 mm Hg with stirring, and the average residence time therein was adjusted to 1.2 hours, thereby conducting the first-stage melt polymerization reaction. The first-stage melt polymerization reaction product was continuously sent to the second melt polymerization tank. The second melt polymerization tank was maintained under the conditions of 275° C. and 6 mm Hg with stirring, and the average residence time therein was adjusted to 1.2 hours, thereby conducting the second-stage melt polymerization reaction. The second-stage melt polymerization reaction product was continuously sent to the third melt polymerization tank.

The third melt polymerization tank was maintained under the conditions of 277° C. and 2 mm Hg with stirring, and the average residence time therein was adjusted to 1.2 hours, thereby conducting the third-stage melt polymerization reaction. The third-stage melt polymerization reaction product was continuously taken out of the reactor in a strand form through a polyester takeoff device, and immersed in water to cool it. Then, the strand-like polymer was cut into a chip form with a strand cutter to obtain melt-polymerized polymer chips having an intrinsic viscosity of 0.61 dl/g.

Further, the polyester chips obtained by melt polymerization were continuously supplied to a stirring crystallizer maintained at about 160° C. in an atmosphere of nitrogen so as to give a residence time of about 5 minutes to perform crystallization. Furthermore, the crystallized chips were continuously supplied to a column type solid phase polymerization apparatus, and subjected to solid phase polymerization in an atmosphere of nitrogen at 205° C. for 15 hours to obtain a polyester having an intrinsic viscosity of 0.80 dl/g.

Results of analysis and evaluation of the resulting polyester and results of evaluation of bottle molding are shown in Table 1.

The resulting polyester was high in the ratio of the number of fine particles, and was good in transparency and externally showed no black foreign matter when molded into bottles.

Comparative Example 5

Using a multistage continuous polymerization apparatus comprising a one-stage slurry tank, two-stage esterification tanks and three-stage melt polymerization tanks, a polyester was produced by the following procedure.

A slurry prepared by mixing 1,941 parts by weight per hour of high purity terephthalic acid with 676 parts by weight per hour of ethylene glycol, and an ethylene glycol solution of orthophosphoric acid (concentration: 1.0% by weight) separately prepared were continuously supplied to the first esterification tank in which 3,627 parts by weight of a reaction solution was stored beforehand, so as to give a phosphorus element amount of 33 ppm based on a polymer after polymerization, and the first-stage esterification reaction was conducted in an atmosphere of nitrogen with stirring under the conditions of 260° C. and 0.5 kg/cm²·G. The average residence time was adjusted to 4 hours, and the reaction product was continuously sent to the second esterification tank.

In the second esterification tank, the second-stage esterification reaction was conducted with stirring under the conditions of 260° C. and 0.05 kg/cm²·G, adjusting the average residence time to 1.5 hours. At this time, a solution of cobalt acetate in ethylene glycol (concentration: 1% by weight) and the catalyst solution B were continuously supplied to the second esterification tank through a pipe connected to a bottom thereof, so as to give a cobalt element amount of 10 ppm based on the polymer after polymerization and an antimony element amount of 210 ppm based on the polymer after polymerization, respectively. The average acid value in the second esterification tank was 450 eq/ton. This esterification product was continuously transferred to the first melt polymerization tank through a pipe.

The first melt polymerization tank was maintained under the conditions of 272° C. and 25 mm Hg with stirring, and the average residence time therein was adjusted to 1.2 hours, thereby conducting the first-stage melt polymerization reaction. The first-stage melt polymerization reaction product was continuously sent to the second melt polymerization tank.

The second melt polymerization tank was maintained under the conditions of 275° C. and 6 mm Hg with stirring, and the average residence time therein was adjusted to 1.2 hours, thereby conducting the second-stage melt polymerization reaction. The second-stage melt polymerization reaction product was continuously sent to the third melt polymerization tank.

The third melt polymerization tank was maintained under the conditions of 277° C. and 2 mm Hg with stirring, and the average residence time therein was adjusted to 1.2 hours, thereby conducting the third-stage melt polymerization reaction. The third-stage melt polymerization reaction product was continuously taken out of the reactor in a strand form through a polyester takeoff device, and immersed in water to cool it. Then, the strand-like polymer was cut into a chip form with a strand cutter to obtain melt-polymerized polymer chips having an intrinsic viscosity of 0.61 dl/g.

Further, the polyester chips obtained by melt polymerization were continuously supplied to a stirring crystallizer maintained at about 160° C. in an atmosphere of nitrogen so as to give a residence time of about 5 minutes to perform crystallization. -Furthermore, the crystallized chips were continuously supplied to a column type solid phase polymerization apparatus, and subjected to solid phase polymerization in an atmosphere of nitrogen at 205° C. for 15 hours to obtain a polyester having an intrinsic viscosity of 0.80 dl/g.

Results of analysis and evaluation of the resulting polyester and results of evaluation of bottle molding are shown in Table 1.

The resulting polyester was low in the ratio of the number of fine particles.

Example 1'

A polyester was obtained in the same manner as with Example 1 with the exception that the intrinsic viscosity of the melt-polymerized polymer chips was 0.73 dl/g, and that the intrinsic viscosity of the polyester chips subjected to solid phase polymerization was 0.80 dl/g.

Results of analysis and evaluation of the resulting polyester and results of evaluation of bottle molding are shown in Table 1.

Example 3

Antimony trioxide and ethylene glycol were placed in a catalyst preparing tank at ordinary temperature so that the concentration of antimony trioxide in ethylene glycol became 1.34% by weight, and stirred for 1 hour. Then, the temperature of the resulting solution was elevated to 165° C. for 5 hours, and the solution was further stirred for dissolution for 1 hour. Subsequently, the temperature thereof was lowered to 100° C. for 3 hours. On the other hand, a 1 wt % solution of phosphorous acid in ethylene glycol was prepared, and this solution was gradually added dropwise to the ethylene glycol solution of antimony trioxide previously prepared, at 100° C. with stirring so as to give an antimony element amount/phosphorus element amount ratio of 210/3 by weight. After further stirred for 3 hours, this solution was transferred to a reservoir maintained at 60° C., and stored therein. This solution was referred to as "catalyst solution A2".

Using a multistage continuous polymerization apparatus comprising a one-stage slurry tank, two-stage esterification tanks and three-stage melt polymerization tanks, a polyester was produced by the following procedure.

A slurry prepared by mixing 1,941 parts by weight per hour of high purity terephthalic acid with 676 parts by weight per hour of ethylene glycol, and an ethylene glycol solution of orthophosphoric acid (concentration: 1.0% by weight) separately prepared were continuously supplied to the first esterification tank in which 3,627 parts by weight of a reaction solution was stored beforehand, so as to give a phosphorus element amount of 30 ppm based on a polymer after polymerization, and the first-stage esterification reaction was conducted in an atmosphere of nitrogen with stirring under the conditions of 260° C. and 0.5 kg/cm$^2$·G. The average residence time was adjusted to 4 hours, and the reaction product was continuously sent to the second esterification tank.

In the second esterification tank, the second-stage esterification reaction was conducted with stirring under the conditions of 260° C. and 0.05 kg/cm$^2$·G, adjusting the average residence time to 1.5 hours. At this time, a solution of cobalt acetate in ethylene glycol (concentration: 1% by weight) and the catalyst solution A2 were continuously supplied to the second esterification tank through a pipe connected to a bottom thereof, so as to give a cobalt element amount of 10 ppm based on the polymer after polymerization and antimony element/phosphorus element amounts of 210 ppm/3 ppm based on the polymer after polymerization (the total amount of the phosphorus element contained in the polymer was 33.0 ppm), respectively. The average acid value in the second esterification tank was 450 eq/ton. This esterification product was continuously transferred to the first melt polymerization tank through a pipe.

The first melt polymerization tank was maintained under the conditions of 272° C. and 25 mm Hg with stirring, and the average residence time therein was adjusted to 1.2 hours, thereby conducting the first-stage melt polymerization reaction. The first-stage melt polymerization reaction product was continuously sent to the second melt polymerization tank.

The second melt polymerization tank was maintained under the conditions of 275° C. and 6 mm Hg with stirring, and the average residence time therein was adjusted to 1.2 hours, thereby conducting the second-stage melt polymerization reaction. The second-stage melt polymerization reaction product was continuously sent to the third melt polymerization tank.

The third melt polymerization tank was maintained under the conditions of 277° C. and 2 mm Hg with stirring, and the average residence time therein was adjusted to 1.2 hours, thereby conducting the third-stage melt polymerization reaction. The third-stage melt polymerization reaction product was continuously taken out of the reactor in a strand form through a polyester takeoff device, and immersed in water to cool it. Then, the strand-like polymer was cut into a chip form with a strand cutter to obtain melt-polymerized polymer chips having an intrinsic viscosity of 0.61 dl/g.

Further, the polyester chips obtained by melt polymerization were continuously supplied to a stirring crystallizer maintained at about 160° C. in an atmosphere of nitrogen so as to give a residence time of about 5 minutes to perform crystallization. Furthermore, the crystallized chips were continuously supplied to a column type solid phase polymerization apparatus, and subjected to solid phase polymerization in an atmosphere of nitrogen at 205° C. for 15 hours to obtain a polyester having an intrinsic viscosity of 0.79 dl/g.

Results of analysis and evaluation of the resulting polyester and results of evaluation of bottle molding are shown in Table 1.

The resulting polyester was high in the ratio of the number of fine particles, and was good in transparency and externally showed no black foreign matter when molded into bottles.

TABLE

| Item | | Example 1 | Comparative Example 1 | Comparative Example 2 | Comparative Example 2' | Comparative Example 3 |
|---|---|---|---|---|---|---|
| Catalyst | Kind | A | B | B | A | B |
| Solution | Haze (%) | 1.3 | 0.2 | 0.2 | 1.3 | 0.2 |
|  | Acid Value at Addition (eq/ton) | 450 | 450 | 450 | 8300 | 450 |
| Results of | Copolymerization  IPA (mol %) | 1.8 | 1.8 | 1.8 | 1.8 | 1.8 |
| Analysis of | Component         DEG (mol %) | 2.9 | 2.8 | 2.9 | 2.9 | 2.8 |
| Melt- | Catalyst        Sb Element (ppm) | 210 | 210 | 210 | 210 | 210 |
| Polymerized | Composition    P Element (ppm) | 33 | 33 | 33 | 33 | 33 |
| Polyester |                P(III) Element (ppm) | 10 | 10 | 10 | 10 | 0 |
|  | Intrinsic Viscosity (dl/g) | 0.63 | 0.61 | 0.61 | 0.62 | 0.62 |
|  | Acetaldehyde (ppm) | 180 | 194 | 194 | 190 | not measured |
| Results of | Intrinsic Viscosity (dl/g) | 0.79 | 0.80 | 0.90 | 0.80 | 0.79 |

TABLE-continued

| | | | | | | |
|---|---|---|---|---|---|---|
| Analysis of Solid Phase-Polymerized Polyester | Solid Phase Polymerization Rate (dl/g/hr) | 0.0154 | 0.0155 | 0.0145 | 0.0143 | 0.0148 |
| | Number of Particles of 0.5 μm or more per 100 mg (particles) | 562800 | 718000 | 720400 | 695400 | 314300 |
| | Ratio of Fine Particles (%) | 93.0 | 48.7 | 49.5 | 68.4 | 66.2 |
| | Critical Particle Size | 0.7 | 0.9 | 1.0 | 0.8 | 0.8 |
| | b Value | −1.1 | 0.0 | 0.4 | −0.3 | 0.7 |
| | L Value | 80.9 | 77.4 | 76.2 | 78.9 | 84.2 |
| Evaluation of Bottle Molding | Haze of Bottle Barrel (%) | 0.6 | 3.0 | 1.4 | 2.4 | 2.7 |
| | Visual Transparency | ○ | x | Δ | Δ | x |
| | Black Foreign Matter | ○ | Δ | Δ | Δ | Δ |

| Item | | Comparative Example 4 | Example 1' | Example 2 | Example 3 | Comparative Example 5 |
|---|---|---|---|---|---|---|
| Catalyst Solution | Kind | C | A | A | A2 | B |
| | Haze (%) | 15.5 | 1.3 | 1.3 | 0.2 | 0.2 |
| | Acid Value at Addition (eq/ton) | 450 | 450 | 450 | 450 | 450 |
| Results of Analysis of Melt-Polymerized Polyester | Copolymerization Component | IPA (mol %) | 1.8 | 1.8 | 1.7 | 1.8 | 1.8 |
| | | DEG (mol %) | 2.7 | 2.9 | 2.8 | 2.8 | 2.8 |
| | Catalyst Composition | Sb Element (ppm) | 210 | 210 | 210 | 210 | 210 |
| | | P Element (ppm) | 33 | 33 | 33 | 33 | 33 |
| | | P(III) Element (ppm) | 33 | 10 | 10 | 3 | 0 |
| | Intrinsic Viscosity (dl/g) | 0.78 | 0.73 | 0.61 | 0.61 | 0.61 |
| | Acetaldehyde (ppm) | not measured | not measured | not measured | not measured | not measured |
| Results of Analysis of Solid Phase-Polymerized Polyester | Intrinsic Viscosity (dl/g) | — | 0.80 | 0.80 | 0.79 | 0.80 |
| | Solid Phase Polymerization Rate (dl/g/hr) | — | note 1) | note 1) | note 1) | note 1) |
| | Number of Particles of 0.5 μm or more per 100 mg (particles) | 18351500 | 603700 | 685100 | 39600 | 17000 |
| | Ratio of Fine Particles (%) | 33.5 | 90.6 | 98.6 | 74.3 | 34.6 |
| | Critical Particle Size | 1.0 | 0.7 | 0.6 | 0.7 | 1.0 |
| | b Value | 0.9 | −0.4 | −1.2 | −0.3 | −0.3 |
| | L Value | 62.5 | 80.2 | 82.7 | 85.7 | 86.5 |
| Evaluation of Bottle Molding | Haze of Bottle Barrel (%) | 2.2 | 0.7 | 0.2 | 1.0 | 2.9 |
| | Visual Transparency | Δ | ○ | ⊚ | ○ | x |
| | Black Foreign Matter | x | ○ | ○ | ○ | ○ |

Description of abbreviations

IPA: Isophthalic acid component

DEG: Diethylene glycol component

Note 1) It is meaningless to compare with other examples and comparative examples because of a different solid phase polymerization apparatus.

Note 2) Results of analysis of solid phase-polymerized polyester of Comparative Example 4 were the results of analysis of melt-polymerized polyester of intrinsic viscosity of 0.78 dl/g.

What is claimed is:

1. A polyester obtained by polymerizing an acid component and a diol component, wherein the acid component comprises a major amount of an aromatic dicarboxylic acid and the diol component comprises a major amount of ethylene glycol, wherein an antimony element is present in said polyester in a content of from 50 to 350 ppm, the number of metallic antimony particles having a diameter of 0.5 μm or more is 30,000 or more per 100 mg of polyester, the ratio of the number of particles having a diameter of 0.5 μm to less than 0.6 μm is 70% or more, and the Hunter L value is 80 or more.

2. The polyester according to claim 1, wherein the ratio of the number of the fine particles is 98% or more.

3. The polyester according to claim 1, wherein the number of the metallic antimony particles having a diameter of 0.5 μm or more is from 100,000 to 1,000,000.

4. The polyester according to claim 1, wherein the content of the phosphorus element is from 2 to 100 ppm.

5. The polyester according to claim 1, wherein the intrinsic viscosity of said polyester is from 0.65 to 0.85 dl/g.

6. The polyester according to claim 1, wherein the ratio of the number of coarse particles having a diameter of 1.5 μm or more to the number of metallic antimony particles having a diameter of 0.5 μm or more contained in 100 mg of the polyester is 1% or less.

7. A stretch blow molded product formed of the polyester according to any one of claims 1 to 6.

8. A method for producing the polyester according to claim 1 comprising mixing the acid component and the diol component to form a reaction material, which comprises adding a preliminary mixed catalyst solution of an antimony compound and a trivalent phosphorus compound as a catalyst, said catalyst solution having a haze of 10% or less, to the reaction material at a stage showing an acid value of 1,000 eq/ton or less before initiation of melt polymerization.

9. The method according to claim 8, wherein the preliminary mixed catalyst solution is added so that the concentrations of an antimony element and a trivalent phosphorus element in the polymer after melt polymerization are from 50 to 350 ppm and from 2 to 100 ppm (on a weight basis), respectively.

10. The method according to claim 8 or 9, wherein the polyester is produced by use of a continuous polymerization apparatus, and the preliminary mixed catalyst solution is added at any stage from a final stage of an esterification process to initiation of a melt polymerization process, followed by melt polymerization to produce the polyester having an intrinsic viscosity of 0.50 to 0.70 dl/g, which is subjected to solid phase polymerization to obtain a polyester having an intrinsic viscosity of 0.70 to 1.5 dl/g.

* * * * *